April 5, 1927.　　　W. LINTERN　　　1,623,738

VEHICLE VENTILATOR

Filed Aug. 8, 1925　　　2 Sheets-Sheet 1

Inventor

William Lintern,

By Bakin Macklin, Golrick Fear

Attorneys

April 5, 1927. 1,623,738
W. LINTERN
VEHICLE VENTILATOR
Filed Aug. 8, 1925 2 Sheets-Sheet 2
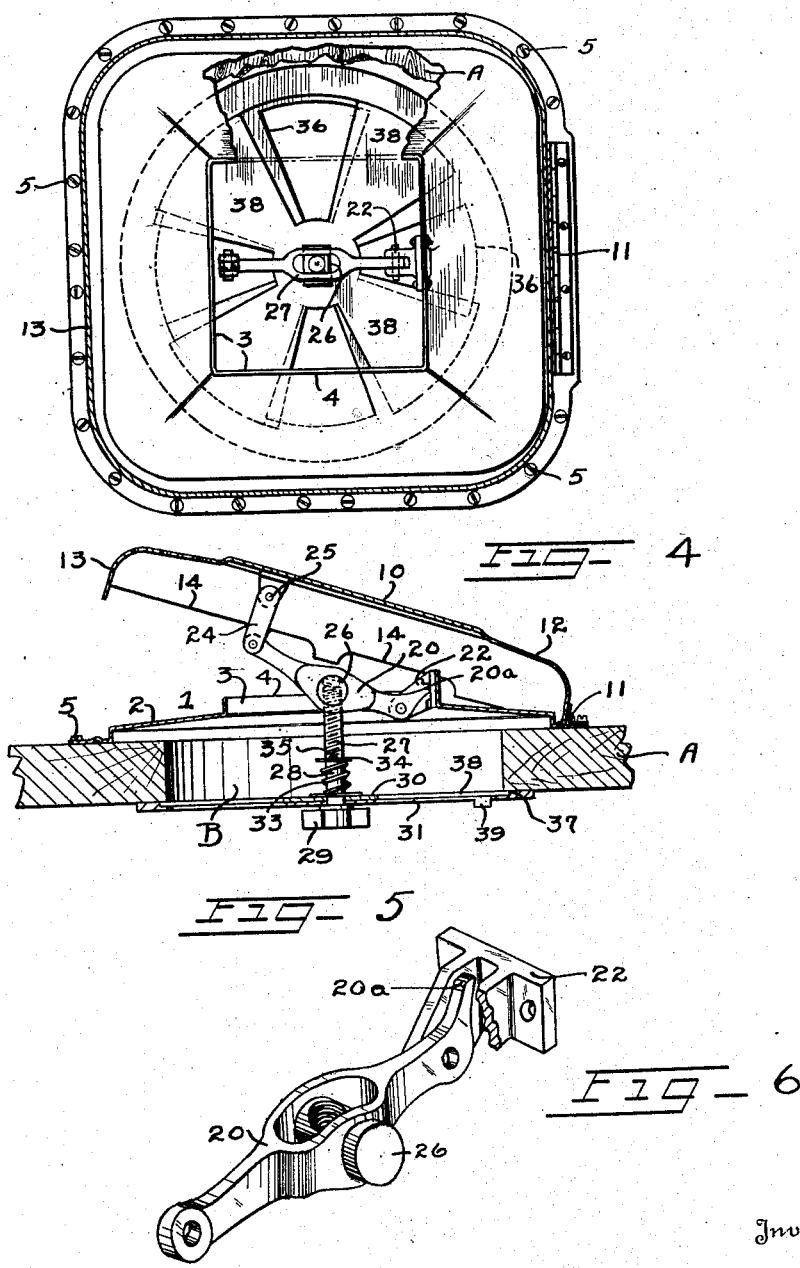

Patented Apr. 5, 1927.

1,623,738

UNITED STATES PATENT OFFICE.

WILLIAM LINTERN, OF CLEVELAND, OHIO.

VEHICLE VENTILATOR.

Application filed August 8, 1925. Serial No. 48,948.

This invention relates to ventilators for vehicles and is well adapted for use in closed automobiles, auto busses and street cars, for example. The primary object is to provide a ventilator which may be easily regulated to vary the amount of air admitted therethrough, which will allow a large discharge without the admission of rain or snow, and which may be easily and cheaply constructed.

Otherwise stated, the object is to provide a ventilator which will furnish adequate ventilation during wet and stormy weather and which during fair weather may be adjusted to furnish considerably greater ventilation.

A feature of the invention is the provision of a hinged cap or cover member capable of being easily adjusted to different positions to vary the discharge. Another feature is the provision in this cap of a great number of small openings whereby when currents of air are passed therethrough, countercurrents are minimized thereby securing greater effective discharge than with a few large openings. The cap is preferably so supported that, under impact of the limb of a tree or like obstruction in the way of the vehicle, it will swing downwardly against a resilient means, and when the obstruction is passed will again assume its adjusted position.

My ventilator preferably operates in conjunction with an opening in the roof of the vehicle body and means such as a shutter may be employed beneath such an opening to close it entirely when desired. A member having a restricted opening is positioned over the body opening on the outside of the wall and to this baffle member, I preferably attach, as by means of a hinge, a cap, arranged to be resiliently and adjustably supported at various heights. When the cap is in its closed position, discharge of air from the vehicle through the opening is provided for by reason of a number of perforations in the walls of the cap in offset relation to the opening in the baffle.

Further features of the invention will hereinafter appear in the detailed description to follow, which relates to the accompanying drawings wherein I have illustrated the preferred form of the invention. The essential characteristics will be summarized in the claims.

Figure 1:
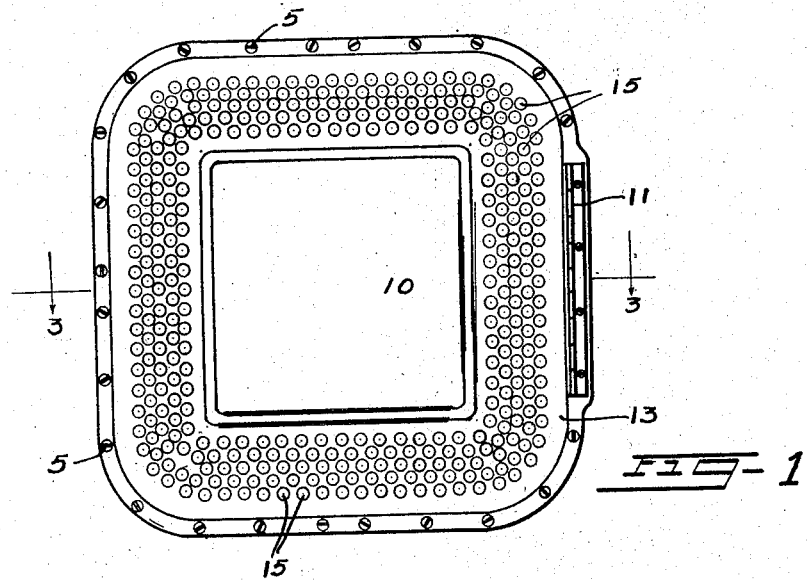
Figure 2:
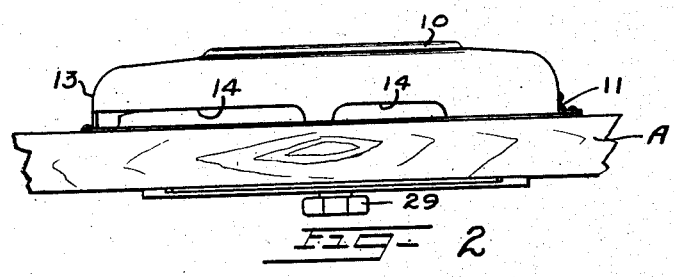
Figure 3:
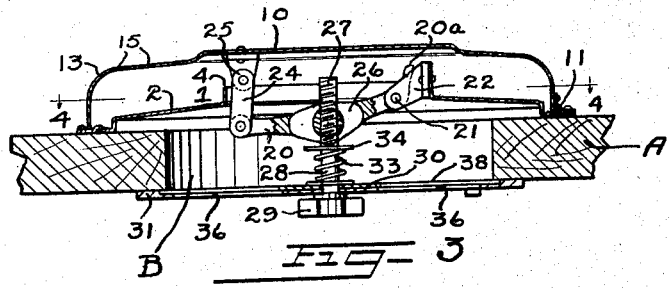

In the drawings, Fig. 1 is a plan view of my ventilator; Fig. 2 is a side elevation thereof; Fig. 3 is a cross section as indicated by the line 3—3 on Fig. 1 showing the cap in closed position; Fig. 4 is a sectional plan as indicated by the line 4—4 on Fig. 3; a portion of the ventilator and vehicle top being broken away to show the shutter arrangement; Fig. 5 is a cross section similar to Fig. 3, but with the cap in raised or open position; Fig. 6 is a perspective of the operating lever.

Referring in detail to the drawings and indicating the various parts by suitable characters, A represents a portion of the vehicle roof having an opening therethrough indicated at B. Above the opening I have shown an inner cover or baffle member 1 having a sloping roof portion at 2 and a restricted central opening 3, preferably square as shown, and having an upwardly extending brim portion 4. This member may be cheaply made from stamped sheet material and may be secured to the wall A as by means of screws indicated at 5.

Above this baffle member I have shown a movable cap 10 which may also be formed of stamped sheet metal and which is shown as hinged at 11 to a portion of the member 1 preferably near the forward edge thereof, that is to say, the edge toward the front of the vehicle. The cap has a sloping roof portion 12 and a downwardly curved brim 13, shown as cut away at intervals along its edges at 14 in order that it may never become entirely closed at its lower edges against the escape of water from within the cap and whereby when its lowered position, a draft is provided which serves to increase the ventilating action.

I have shown the sloping roof portion of the cap as provided with a great number of small openings 15 preferably arranged close together as shown. I have found that the discharge afforded by such a large number of small openings is greater than that of a smaller number of larger openings or a single large opening having even greater total area, and the reason for this, I believe to be that countercurrents such as would tend to obstruct the path of air leaving the vehicle through the ventilator, are eliminated.

The discharge openings 15 as indicated in Fig. 5 are over the inclined roof portion 2 of the baffle member 1 at all times and then hence rain admitted through the openings will be deflected by this roof portion onto the roof of the vehicle body. When the guard is in raised position, as for instance in Fig. 5, the brim 4 extending above the roof portion 2 of the baffle is so disposed that even in a driving storm there will be very little, if any, rain likely to be driven under the brim of the cap and into the opening 3.

To provide for adjustably and resiliently raising the cap, I preferably employ a link and lever arrangement, the members of which may be pivoted to the baffle and cap respectively and which are arranged to be operated from within the vehicle by means of a knob and screw extending into a nut carried by the lever. Such an arrangement may comprise a lever 20 pivoted at 21 to a bracket 22 secured to a portion of the brim 4 of the inner cover. The outer arm of the lever pivotally carries a link 24 which is also pivoted at 25 to a bracket shown as mounted on the roof of the cap. The lever 20, intermediate of its ends carries a trunnioned nut 26 into which is threaded a screw 27. The shank 28 of the screw slidably engages a support carried by the body wall, the support in this case being shutter members 30 and 31 to be later described.

Within the vehicle the screw may carry a knob 29 which it will be seen may be operated to turn the screw, thus causing the trunnioned nut and its lever arm 20 to move up or down to adjustably position the cap 10.

By reason of the cap being hinged to the roof at its forward edge and having the constant openings 14 and the variable opening when inclined, the movement of the vehicle causes a strong rearward draft from under the cap which thus rapidly carries away air from the interior of the vehicle. The adjustment of the cap increases or reduces the amount of this rearward draft but the openings 14 provide for such draft even though the cap is entirely closed as shown in Fig. 2.

Surrounding the shank of the screw, I have shown a compression spring 33 which bears against a portion of the shutter member 30 at its lower end and which may be retained against upward expansion by a washer 34 and a pin 35 passing through the screw. It will be readily understood that when the cap is in raised position it may be forced downwardly against the spring independently of the nut and screw, as for instance when the cap contacts with the projecting limb of a tree. Under ordinary conditions the spring will hold the cap in the desired adjusted position.

To limit the lift of the cap as well as to prevent the screw 27 from becoming entirely disengaged from the nut 26, I have provided a stop indicated at 20ª arranged in the embodiment shown to strike a portion of the bracket 22 when the cap is raised to the position shown in Fig. 5. It will be seen that when this projection 20ª has engaged the bracket no further tipping of the cap is possible, but further turning of the knob will compress the spring and the knob will, upon being further turned, project inwardly into the body of the vehicle. This movement and the added stress against turning will advise the operator that the cap has been raised to its limit.

In order to close the opening B entirely if desired, I may employ a shutter arrangement, which as shown, comprises an annular plate (previously designated 31), having sector shaped holes 36 through it, and a co-operating rotatable closure plate (previously designated 30) adapted to overlie these openings. This closure plate, which may be in the form of a Maltese cross, and rotatably mounted on the shank of the screw 28, and lies within a recess 37 formed by an overcut portion of the member 31 and the slightly overhanging edge of the roof of the vehicle. When this cross is rotated, the arms 38 may completely or partially close the passages afforded by the holes 36. A depending lug 39 rigid with one of the arms and extending through one of these holes 36, may serve as an operating means for turning the plate.

It will be seen from the above description, that I have provided a ventilator which may be easily and cheaply constructed, which may be mounted in a compact space in the roof of a vehicle, and which is so arranged as to secure enough ventilation for the safety of the passengers in wet and stormy weather without admitting the undesirable weather elements into the interior of the vehicle body and which in fair weather may be adjusted for securing considerably greater ventilation to provide for the comfort of the passengers without attendant drafts.

I am aware that the device is capable of considerable modification while keeping within the spirit of my invention and do not therefore wish to be limited to unessential details.

The ventilator may be used in various ways not above mentioned, for example, when used on the roof of a vehicle, it may be inclined either forwardly or rearwardly, depending on its position relative to the body, it being sometimes desirable to have the cap arranged to incline forwardly when positioned at the forward portion of the body, in which case currents of air will readily pass into the body, while when it is positioned at the rear of the body it is better to incline the cap to the rear so that the currents of air admitted by the forwardly inclined cap or caps at the front may be more readily discharged.

Having thus described my invention, I claim:—

1. In combination with a vehicle body wall having a ventilator opening therein, a movable cap member exteriorly of the opening having a roof portion and down turned edges, such edges being normally in contact with the body wall, said cap having a plurality of apertures in said roof portion leading directly to the open air, whereby ventilation of the interior of the body is afforded when the cap is closed, and means for raising the cap for additional ventilation.

2. In combination with a vehicle body wall having a ventilator opening therein, a movable cap member exteriorly of the opening having a downwardly extending brim cut away at intervals along its lower edge, said cap having an opening in its roof portion, whereby ventilation of the body is afforded when the cap is in closed position, means for preventing the weather elements from entering the opening in the body when the cap is closed, and means for raising the cap for additional ventilation.

3. The combination, with a vehicle body wall having a ventilator opening therein, of a substantially single piece cap member mounted over such opening having a large number of openings formed therein in its upper or roof portion arranged to receive and discharge air currents passing from the opening in the wall directly into the atmosphere externally of the vehicle body and above the cap, and means for raising the cap whereby better ventilation may be secured.

4. In combination with a vehicle body wall having a ventilator opening therethrough, a cap movably mounted over said opening and arranged to be adjustably held in upraised position, a baffle member positioned intermediate the opening and the cap and having an opening therein in communication with the ventilator opening, said cap having a large number of openings in its roof portion for discharging air admitted through the opening in the baffle member, and said baffle opening being out of registration with the openings.

5. In combination with a vehicle body wall having a ventilator opening, a cap movably mounted over said opening, said cap having ventilation apertures whereby ventilation may be secured when the cap is in lowered position, resilient means for supporting said cap, and adjustable means associated therewith for elevating the cap to various raised positions for greater ventilation, said resilient means being so arranged that the cap may be forcibly lowered irrespective of the adjustable means.

6. In combination with a vehicle body wall having an opening therethrough, a member having a raised central portion and an opening therein, said raised portion sloping downwardly away from the opening to serve as a water shed, a cap movably mounted above said raised portion having a downwardly extending brim and having a series of openings therethrough above said sloping portion, and means extending through the opening in the wall into engagement with the cap for raising it.

7. In combination with a vehicle body wall having an opening therein, a member having a central opening positioned above said wall opening and having a downwardly sloping wall adjacent the opening and a cap movably mounted over the opening having a downwardly extending brim partially cut away at its lower edge, and having a series of small openings above the sloping portion.

8. In combination with a vehicle body wall having an opening therein, a member partially covering said opening and secured to the wall having a central opening defined by an upwardly extending brim, a cap movably mounted over said member having a downwardly extending brim the edges of which are adapted to extend below the plane of said first named brim, said brim on the cap being cut away along the bottom edges thereof whereby the cap, when in lowered position, is open along such edges.

9. In combination with a vehicle body wall having an opening therein, a shutter across said opening, a cap hinged at its forward edge and arranged to cover the opening, and adjusting means for the cap including a rotatable screw about the shank of which the shutter may turn, and resilient means associated with the screw, whereby the cap may be forcibly lowered by projecting the screw downwardly through the shutter out of its normal position.

10. In combination with a vehicle body wall having an opening therethrough, a shutter supported by the wall and adapted to close one orifice of said opening, a cap hinged to the wall and disposed over the other orifice, a baffle member having a restricted central opening, and downwardly sloping walls leading from the opening and means including a screw resiliently supported by the shutter and a lever pivotally supported by the baffle member for maintaining the cap in predetermined raised positions.

11. In combination with a vehicle wall member having an opening therein, a movable cap member positioned over the opening having a roof portion and a downwardly extending brim member normally contacting with the wall member, one of said members being cut away at intervals along the line of contact, and a baffle member within the cap and having an opening in communication with the wall opening, said baffle member extending into the cap materially above the line of contact, and means for raising and lowering the cap.

12. In combination, a vehicle wall member having a ventilator opening, a raisable cap having a downturned brim member normally contacting with the wall member, one of said members being cut away at the line of contact, an opening in the top of the cap, deflecting means within the cap arranged between the opening in the wall and the cap opening to prevent entrance of weather elements into the wall opening, said means being also arranged to permit currents of air to pass from one of the said openings to the other.

13. In combination with a vehicle body wall having a ventilator opening therein, of a metal cap member movably mounted over said opening, said cap having perforations in the roof thereof, a baffle member interposed between the opening in the said wall and said perforations, whereby weather elements entering the perforations are deflected away from the body opening, said baffle permitting currents of air to pass through both the wall opening and perforations when the cap is closed, and means for raising the cap whereby greater ventilation may be secured.

14. In combination with a vehicle body wall having a ventilator opening therein, a cap movably mounted over said opening, said cap having a ventilating aperture in the roof thereof whereby ventilation may be secured when the cap is closed, means for deflecting weather elements which may enter said roof opening and for preventing such elements from entering the body opening, and adjustable means for raising the cap whereby additional ventilation may be secured.

15. In combination, a vehicle wall member having a ventilator opening therein, a movable cap having a downturned brim positioned over said opening, said cap having an opening in the roof thereof, deflecting means within the cap positioned between the said roof opening and wall opening, said deflecting means being so arranged that currents of air may pass from one of said openings to the other when the cap is in closed position, and means whereby the weather elements deflected by said deflecting means may pass between the brim of the cap and body wall when the cap is in closed position.

In testimony whereof, I hereunto affix my signature.

WILLIAM LINTERN.